(12) United States Patent
Fukuda

(10) Patent No.: US 9,838,223 B2
(45) Date of Patent: Dec. 5, 2017

(54) BIDIRECTIONAL COMMUNICATION SYSTEM AND SERVER APPARATUS USED THEREIN

(75) Inventor: Reiji Fukuda, Kokubunji (JP)

(73) Assignee: CHEPRO CORPORATION, Tokyo (JP)

(*) Notice: Subject to any disclaimer, the term of this patent is extended or adjusted under 35 U.S.C. 154(b) by 431 days.

(21) Appl. No.: 13/697,263

(22) PCT Filed: May 11, 2010

(86) PCT No.: PCT/JP2010/057928
§ 371 (c)(1),
(2), (4) Date: Nov. 9, 2012

(87) PCT Pub. No.: WO2011/141993
PCT Pub. Date: Nov. 17, 2011

(65) Prior Publication Data
US 2013/0060847 A1    Mar. 7, 2013

(51) Int. Cl.
*G06F 15/173* (2006.01)
*H04L 12/66* (2006.01)
*H04L 29/12* (2006.01)

(52) U.S. Cl.
CPC ............ *H04L 12/66* (2013.01); *H04L 61/256* (2013.01); *H04L 61/303* (2013.01); *H04L 61/2514* (2013.01)

(58) Field of Classification Search
CPC ............. H04L 61/2575; H04L 61/2578; H04L 29/12528

(Continued)

(56) References Cited

U.S. PATENT DOCUMENTS 6,947,992 B1 * 9/2005 Shachor .................. 709/228
6,950,914 B2 * 9/2005 Iwami .................. G06F 3/0611
                                                    709/214

(Continued)

FOREIGN PATENT DOCUMENTS

CN    1321935 A    11/2001
CN    1625881 A     6/2005

(Continued)

OTHER PUBLICATIONS

Keiji, Technology for Constructing Web Server, Third, UNIX User, Nov. 1, 1997, vol. 6, No. 11.

*Primary Examiner* — Khanh Dinh
*Assistant Examiner* — Clarence McCray
(74) *Attorney, Agent, or Firm* — Polsinelli PC

(57) ABSTRACT

When a client has accessed a server via routers, the server inherits an IP address used during the access and further adds an arbitrary system ID thereto, thereby generating a new connection address. The server then notifies the system ID to the client and further generates a communication process for communicating with the client. The communication between the client and the server from then on is performed, based on the new connection address, by the communication process. Since the connection address, which is generated anew for the communication between the communication process of the server and the client, includes the same IP address as was used during the initial access, the NAT functions of the routers can be used without any problems.

2 Claims, 2 Drawing Sheets

(58) Field of Classification Search
USPC ........................................................ 709/245
See application file for complete search history.

(56) References Cited

U.S. PATENT DOCUMENTS

| | | | | |
|---|---|---|---|---|
| 7,003,574 B1* | 2/2006 | Bahl | ............................. | 709/228 |
| 7,466,810 B1* | 12/2008 | Quon et al. | ............... | 379/201.01 |
| 7,908,481 B1* | 3/2011 | Donzis | .............. | H04L 29/12367 |
| | | | | 380/227 |
| 8,165,122 B2* | 4/2012 | Kotalwar | ............ | H04L 12/1886 |
| | | | | 370/390 |
| 8,260,840 B1* | 9/2012 | Sirota | ................... | G06F 9/5061 |
| | | | | 370/216 |
| 8,589,582 B2* | 11/2013 | Melsen | ............... | H04L 61/2015 |
| | | | | 709/230 |
| 9,325,621 B1* | 4/2016 | Ramamurthy | ........ | H04W 28/08 |
| 9,491,000 B2* | 11/2016 | Takahashi | ........... | H04L 12/4633 |
| 2003/0120810 A1* | 6/2003 | Ohta | ................. | H04L 29/12009 |
| | | | | 709/245 |
| 2004/0017818 A1* | 1/2004 | Chung | .............. | H04L 29/06027 |
| | | | | 370/401 |
| 2004/0133692 A1* | 7/2004 | Blanchet et al. | .............. | 709/230 |
| 2004/0139228 A1* | 7/2004 | Takeda et al. | ................. | 709/245 |
| 2004/0218611 A1* | 11/2004 | Kim | ............................. | 370/401 |
| 2005/0010665 A1* | 1/2005 | Kuno | ..................... | H04L 29/06 |
| | | | | 709/224 |
| 2005/0015584 A1* | 1/2005 | Takechi et al. | ................ | 713/151 |
| 2005/0105543 A1* | 5/2005 | Ikenaga | ............ | H04L 29/12367 |
| | | | | 370/428 |
| 2005/0177865 A1* | 8/2005 | Ng | ...................... | H04L 12/5695 |
| | | | | 726/3 |
| 2007/0022289 A1* | 1/2007 | Alt et al. | ...................... | 713/168 |
| 2007/0036143 A1* | 2/2007 | Alt et al. | ......................... | 370/352 |
| 2007/0097989 A1* | 5/2007 | Sato | .................. | H04L 29/06027 |
| | | | | 370/395.52 |
| 2007/0097990 A1* | 5/2007 | Ozaki | ............... | H04L 29/06027 |
| | | | | 370/395.52 |
| 2007/0147419 A1* | 6/2007 | Tsujimoto | ........... | H04L 41/0226 |
| | | | | 370/466 |
| 2007/0147421 A1* | 6/2007 | Kim | ........................ | H04L 12/66 |
| | | | | 370/466 |
| 2008/0056276 A1* | 3/2008 | Gobara | ................... | H04L 29/06 |
| | | | | 370/395.42 |
| 2008/0072312 A1* | 3/2008 | Takeyoshi | ........... | H04L 12/4641 |
| | | | | 726/15 |
| 2008/0201486 A1* | 8/2008 | Hsu | ........................ | H04L 29/06 |
| | | | | 709/238 |
| 2008/0306798 A1* | 12/2008 | Anke | ........................ | G06F 8/61 |
| | | | | 705/7.26 |
| 2009/0013069 A1* | 1/2009 | Gobara | ................... | H04L 29/06 |
| | | | | 709/224 |
| 2009/0177786 A1* | 7/2009 | Takahashi | ......... | H04L 29/12066 |
| | | | | 709/228 |
| 2009/0219943 A1* | 9/2009 | Gobara | ................... | H04L 29/06 |
| | | | | 370/419 |
| 2009/0249222 A1* | 10/2009 | Schmidt et al. | .............. | 715/751 |
| 2009/0285175 A1* | 11/2009 | Nix | ....................... | H04L 29/125 |
| | | | | 370/331 |
| 2009/0323632 A1* | 12/2009 | Nix | ....................... | H04L 29/125 |
| | | | | 370/331 |
| 2010/0014521 A1* | 1/2010 | Tamura | ............. | H04L 29/12254 |
| | | | | 370/392 |
| 2011/0202610 A1* | 8/2011 | Chaturvedi et al. | .......... | 709/206 |
| 2012/0207173 A1* | 8/2012 | Namihira | ........... | H04L 12/6418 |
| | | | | 370/400 |
| 2014/0150095 A1* | 5/2014 | Zhao | ....................... | H04L 29/06 |
| | | | | 726/22 |

FOREIGN PATENT DOCUMENTS

| | | |
|---|---|---|
| CN | 101047548 A | 10/2007 |
| JP | 10-247946 A | 9/1998 |
| JP | 2004-120547 A | 4/2004 |
| JP | 2005-027318 A | 1/2005 |
| JP | 2005-151142 A | 6/2005 |

* cited by examiner

BIDIRECTIONAL COMMUNICATION SYSTEM AND SERVER APPARATUS USED THEREIN

CROSS REFERENCE TO RELATED APPLICATIONS

This application is a National Phase filing under 35 U.S.C. § 371 of PCT/JP2010/057928 filed on May 11, 2010, the entire contents of which are hereby incorporated by reference.

TECHNICAL FIELD

The present invention relates to a bidirectional communication system and a server apparatus to be used therein, and more particularly to a bidirectional communication system having a structure in which a client can be connected to a server through a router on internet and the server offers a service to meet a demand given from the client.

BACKGROUND ART

HTTP (HyperText Transfer Protocol) to be generally used on internet is a communication protocol to be used for transmitting/receiving contents described in HTML (HyperText Markup Language) or XML (Extensible Markup Language) between a client (Web browser) and a server. The HTTP has a main object to transmit/receive data in a HyperText format and cannot easily exchange binary data such as an image or a voice. At present, it is possible to partially transmit/receive the binary data by utilizing the special technique such as AJAX or Silverlight.

Moreover, the HTTP is a so-called request-response type unidirectional communication protocol. More specifically, in the HTTP, a client transmits a request to a server and the server returns data to meet a request as a response thereof. When the response is transmitted, the server is basically returned into an initial state. In other words, the server does not save a state of the client and cannot transmit data to the client in an active action started from the server.

Recently, the technique referred to as SaaS (Software as a Service) spreads out over internet. The SaaS indicates software (mainly application software) capable of utilizing a required function as a service if necessary. In general, the Saas has a mechanism in which the client can give access to the server via the internet to utilize a necessary function, and it is possible to use a service required by a user on demand.

The SaaS is also operated basically in accordance with the HTTP. For this reason, although it is desired to transmit data to the client in an action started from the server depending on the contents of the service, this cannot be usually carried out. Moreover, the SaaS has a mechanism in which a call back to the client from the service of the server (application software) cannot be carried out in respect of a security. For this reason, it is also impossible to transmit a state of the server to the client through a router or a firewall.

On the other hand, a framework referred to as .NET Remoting provided by Microsoft Corporation has a function for carrying out a call back from a server to a client. By using the .NET Remoting, therefore, it is possible to perform a bidirectional communication through the HTTP and to also transmit/receive data depending on an action started from the server in addition to a transmission/receipt of data corresponding to an action started from the client. Furthermore, the .NET Remoting also has a data communication function in a binary format. Therefore, it is also possible to easily implement a data communication in the binary format in a combination of the HTTP and the .NET Remoting.

However, the .NET Remoting has a drawback that NAT (Network Address Translation) traversal of a router cannot be carried out when services demanded by users are to be individually offered as in the Saas. The NAT represents a technique for interconverting a local address which can be accepted by only LAN in a hub and a global address on internet in a one-to-one relationship. When giving access to a server on the internet from a terminal in the hub to utilize a service of the SaaS, it is necessary to carry out an address conversion (NAT traversal) through the NAT. However, there is a problem in that the NAT traversal cannot be carried out with the use of the .NET Remoting in an SaaS environment.

In other words, in the case in which access is given to a server 200 from a client 100 through internet 300 and the client 100 gives a request for utilizing a desirable service 201 to the server 200 as shown in FIG. 4, a conversion from a local address to a global address is carried out by an NAT function in a router 400 provided between the client 100 and the internet 300. Moreover, a conversion from the global address to the local address is carried out by the NAT function in a router 500 provided between the internet 300 and the server 200. When returning a result of the service 201 from the server 200 to the client 100, however, it is impossible to carry out a reverse conversion from the local address to the global address in the router 500. The reason is as follows.

In the case of the SaaS, the server 200 needs to offer the same service 201 in response to requests given from the clients 100. In order to enable connection waiting of the clients 100, therefore, application software of the service 201 generates a communication process 202 corresponding to the client 100 which is once connected. A new IP address is set to the communication process 202 to be generated at this time. In other words, by generating the communication process 202 for each client 100 giving access to the server 200 and causing the communication process 202 to take charge of a communication with each client 100, it is possible to offer the service 201 in response to the requests sent from the clients 100.

Consequently, a local address to be used by the communication process 202 is a different IP address from the local address in a connection through the client 100 (which is converted from the global address through the router 500). For this reason, even if a response is to be sent from the communication process 202 to the client 100, the local address of the communication process 202 cannot be converted to the global address on the internet 300 by the NAT function of the router 500. As a result, a response to the client 100 cannot be sent.

By using an exclusive protocol such as SOAP or ICA (Independent Computing Architecture) in place of the HTTP, it is not necessary to utilize the .NET Remoting. For this reason, the problem of the NAT traversal can be solved. However, the exclusive protocol has no versatility and cannot carry out a binary data communication. Furthermore, there is also a problem in that a processing speed is lower than that of the HTTP.

As another means for solving the NAT traversal, moreover, there is also proposed the technique for specifying an IP address to be converted by an NAT function of a router, and predicting a port number to be converted by the NAT function of the router and registering them in a relay server as exchange information for the NAT traversal (for example, see Patent Document 1)

Patent Document 1: Japanese Laid-Open Patent Publication No. 2005-151142

However, the technique described in the Patent Document 1 serves to carry out an identification in a combination of a port number with an IP address in order to communicate with a specific terminal. The port number is registered in a relay server, and the port number is also converted simultaneously with an address conversion through the NAT function and always fluctuates in a communication between terminals. For this reason, it is necessary to have many port numbers in order to communicate with a large number of clients as in SaaS. However, the port number is also used usually for other purpose, and the number of the port numbers which can be used for the NAT traversal is limited. As a result, there is a problem in that the number of clients capable of simultaneously offering a service is decreased.

DISCLOSURE OF THE INVENTION

The present invention has been made in order to solve the problems and has an object to enable an offer of a service of an SaaS type to a large number of clients without a problem of NAT traversal by using a data communication in a binary format in addition to a HyperText format through HTTP which can be used for general purpose on internet.

In order to attain the object, in the present invention, a server gives optional identification information to an IP address sent with a conversion from a global address to a local address through a router to generate a new connection address and notifies a client of the identification information when the client gives access to the server through the router. Moreover, the server generates a communication process for carrying out a communication with the client and the communication process performs a subsequent communication with the client based on the new connection address.

According to the present invention having the structure described above, when the client gives access to the server, the communication process is generated for a subsequent communication, and a new connection address to be used in the communication process is set. At this time, the new connection address is set in such a configuration that an IP address used in the access from the client to the server is exactly inherited and optional identification information is given.

For this reason, the IP address itself is not changed. Therefore, it is possible to use, without problems, an NAT function of the router for causing the global address and the local address to correspond to each other in a one-to-one relationship. Moreover, the new connection address is set in such a configuration that the optional identification information is given in place of a port number having a limitation of the number of availability. Consequently, it is also possible to increase the number of the clients capable of carrying out the NAT traversal and offering a service at the same time.

Furthermore, it is possible to apply a mechanism for the NAT traversal according to the present invention while using an HTTP protocol without requiring to utilize an exclusive protocol for the NAT traversal. By combining .NET Remoting with the HTTP, it is also possible to easily implement a data communication in a binary format.

As described above, according to the present invention, it is possible to offer a service of an SaaS type to a large number of clients without a problem of the NAT traversal by using the data communication in the binary format in addition to a HyperText format through the HTTP which can be utilized for general purpose on internet.

BEST MODE FOR CARRYING OUT THE INVENTION

Figure 1:
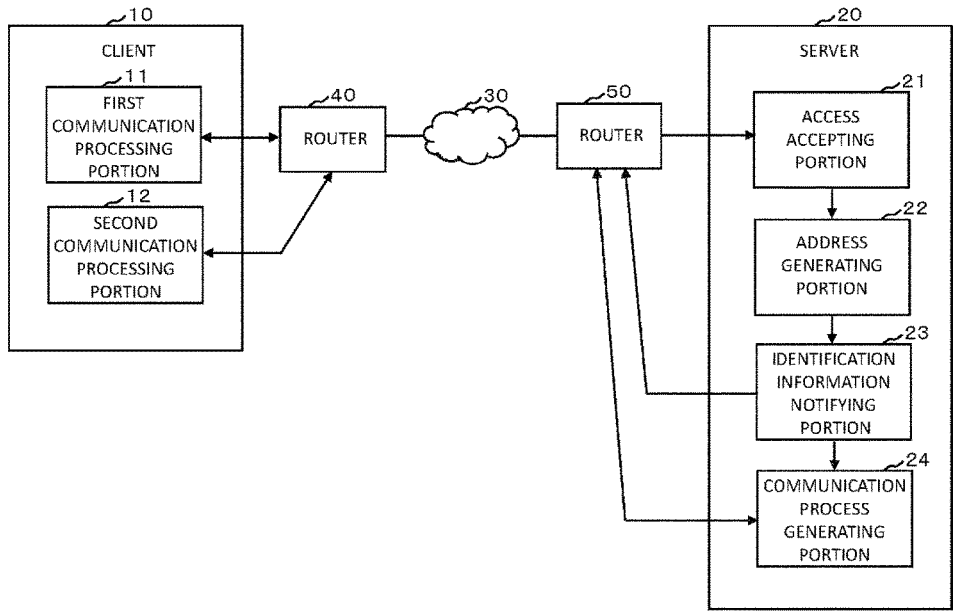
FIG. 1 is a block diagram showing an example of a structure of a bidirectional communication system according to the present embodiment.

An embodiment according to the present invention will be described below with reference to the drawings. FIG. 1 is a block diagram showing an example of a structure of a bidirectional communication system according to the present embodiment. The bidirectional communication system according to the present embodiment has a structure in which a client 10 can be connected to a server 20 through routers 40 and 50 on internet 30 and a service to meet a demand sent from the client 10 is offered by application software on the server 20.

In the case in which access is given to the server 20 from the client 10 through the internet 30 and the client 10 gives a request for utilizing a desirable service to the server 20, a conversion from a local address to a global address is carried out by an NAT function in the router 40 provided between the client 10 and the internet 30. Moreover, a conversion from the global address to the local address is carried out by the NAT function in the router 50 provided between the internet 30 and the server 20.

The server 20 executes application software (not shown) corresponding to a service required from the client 10 through the access described above in order to offer the service. Then, a result of the execution is returned to the client 10.

At this time, the application software of the server 20 generates a communication process corresponding to the clients 10 which are once connected and entrusts a subsequent communication with the clients 10 to the communication process in order to enable a service to be offered to the clients 10 in an SaaS type. A new connection address is set to the communication process to be generated at this time. The present embodiment features the method of setting a connection address. This will be described below in detail.

The client 10 according to the present embodiment includes a first communication processing portion 11 and a second communication processing portion 12 as functional structures thereof. For convenience of the description, although the first communication processing portion 11 and the second communication processing portion 12 are shown separately, these are constituted by a common communication IF (DLL: Dynamic Link Library).

Moreover, the server 20 according to the present embodiment includes an access accepting portion 21, an address generating portion 22, an identification information notifying portion 23 and a communication process generating portion 24 as functional structures thereof. Each of the functional structures of the access accepting portion 21, the address generating portion 22 and the identification information notifying portion 23 is implemented by application software for offering a service to the client 10.

The first communication processing portion 11 of the client 10 gives access to the access accepting portion 21 of the server 20. The access is first performed by the client 10 in order to give the server 20 a request for offering a desirable service. In the present embodiment, an IP address for which a system ID (corresponding to identification information according to the present invention) and a port number are added is used as a connection address to be utilized in the access. The system ID is a peculiar code to the bidirectional communication system according to the present embodiment and is predetermined (for example, "WAO"). The port number is a fixed number which is predetermined (for example, "9000").

The access accepting portion 21 of the server 20 accepts, from the first communication processing portion 11, access to be given through the internet 30 and the routers 40 and 50 in order to send a request for a service.

When the access is accepted by the access accepting portion 21, the address generating portion 22 gives an optional system ID to an IP address (a part of the connection address) sent with a conversion from a global address to a local address through the router 50, thereby generating a new connection address.

More specifically, the address generating portion 22 exactly inherits the IP address and the port number sent with the conversion from the global address to the local address through the router 50, and at the same time, exchanges the predetermined system ID ("WAO") given to the IP address into an optional system ID, thereby generating a new connection address. The address generating portion 22 issues a new system ID to generate a connection address every time the access accepting portion 21 receives access from the client 10.

The identification information notifying portion 23 uses the new connection address generated by the address generating portion 22 to notify the second communication processing portion 12 of the client 10 of the system ID given newly by the address generating portion 22 through the internet 30 and the routers 40 and 50.

In the communication, the NAT conversion of the IP address is carried out in the routers 40 and 50. However, the new connection address generated by the address generating portion 22 has no change in the IP address itself. Therefore, the NAT function of the router causing the global address and the local address to correspond to each other in a one-to-one relationship can be used without problems. In other words, it is possible to specify the IP address of the client 10 giving a request for a service without problems, thereby carrying out a notice of the system ID.

The communication process generating portion 24 generates a communication process for communicating with the client 10 based on the new connection address generated by the address generating portion 22. The communication process generating portion 24 can generate a plurality of communication processes in response to the request given from the client 10, and the communication process generating portion 24 manages the generated communication process. When the communication process generating portion 24 generates the communication process, the communication process waits for access given from the client 10. Subsequently, the communication process uses the new connection address to carry out a bidirectional communication with the client 10.

The second communication processing portion 12 of the client 10 communicates with the communication process generated by the communication process generating portion 24, thereby receiving an offer of a desirable service from the server 20. At this time, the second communication processing portion 12 uses, as a connection address, a new address generated by giving the IP address the system ID of which notice is sent from the identification information notifying portion 23. More specifically, the second communication processing portion 12 exchanges the predetermined system ID ("WAO") used first by the first communication processing portion 11 into the optional system ID of which notice is sent from the server 20, thereby generating a new connection address to give access to the server 20.

Figure 2:
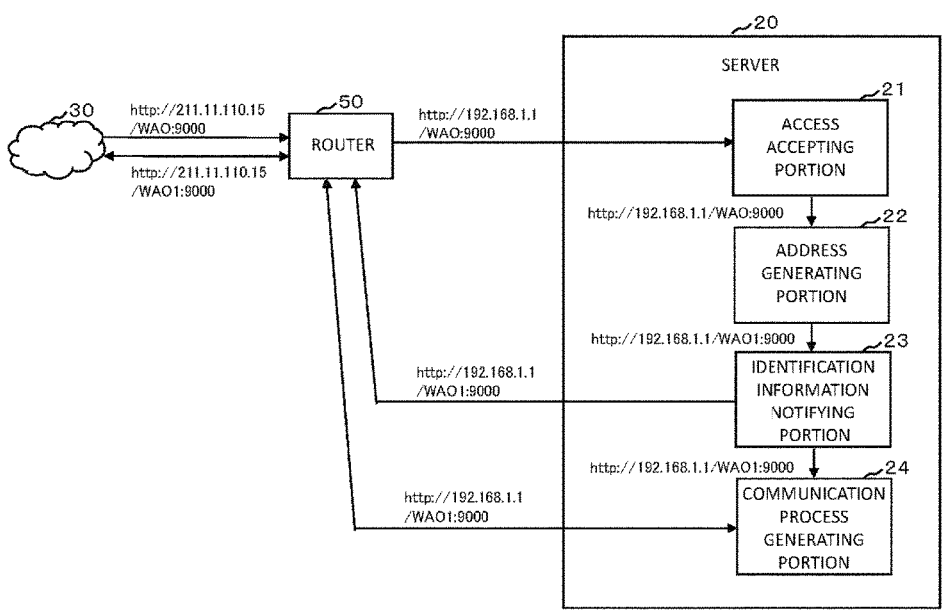
FIG. 2 is a diagram showing an example of a conversion of a connection address between internet and a server.

FIG. 2 is a diagram showing an example of the conversion of the connection address between the internet 30 and the server 20. When the first communication processing portion 11 of the client 10 which is not shown in FIG. 2 first gives access to the access accepting portion 21 of the server 20, a connection address obtained by adding the fixed system ID ("WAO") and the fixed port number ("9000") to the IP address is used as shown in FIG. 2. Herein, it is assumed that the connection address (the global address) on the internet 30 is "http://211.11.110.15/WAO: 9000" (in which a part of "211.11.110.150" is the IP address).

The global address is converted to the local address by the NAT function in the router 50. The NAT conversion is carried out by converting the IP address portion from the global address to the local address. Herein, it is assumed that the local address subjected to the NAT conversion from the global address is "http://192.168.1.1/WAO: 9000".

When the access accepting portion 21 accepts access based on the local address, the address generating portion 22 exactly inherits an IP address and a port number which are included in the local address, and at the same time, exchanges the system ID ("WAO") given to the IP address into an optional system ID (for example, "WAO1"), thereby generating a new connection address of "http://192.168.1.1/WAO1:9000".

The identification information notifying portion 23 uses the new connection address generated by the address generating portion 22, thereby notifying the client 10 of the newly given system ID ("WAO1") through the router 50. In the communication, the IP address portion is subjected to the NAT conversion from the local address to the global address in the router 50. Consequently, there is obtained a global address of "http://211.11.110.15/WAO1:9000".

After the notification is carried out, a bidirectional communication is performed by using a new connection address between the second communication processing portion 12 of the client 10 and the communication process generated by the communication process generating portion 24 of the server 20. At this time, the NAT conversion of the global address of "http://211.11.110.15/WAO1:9000" and the local address of "http://192.168.1.1/WAO1:9000" is carried out bidirectionally in the router 50.

It is assumed that access for newly demanding another service is given to the server 20 from the same client 10. At this time, a connection address to be used in access to be given from the first communication processing portion 11 to the access accepting portion 21 is the same as that described above. In other words, the global address on the internet 30 is "http://211.11.110.15/WAO:9000" and the local address obtained by carrying out the NAT conversion over the global address on the internet 30 in the router 50 is "http://192.168.1.1/WAO:9000".

When the access accepting portion 21 accepts the access, the address generating portion 22 exchanges the system ID ("WAO") included in the local address used in the access into an optional system ID (for example, "WAO2") which is different from that described above, thereby generating a new connection address of "http://192.168.1.1/WAO2:9000". The identification information notifying portion 23 uses the new connection address thus generated, thereby notifying the client 10 of the newly given system ID ("WAO2"). Moreover, the communication process generating portion 24 generates another communication process which is different from that described above.

After the client 10 is notified of the new system ID, a bidirectional communication is carried out by using the new connection address between the second communication processing portion 12 of the client 10 and another communication process generated by the communication process generating portion 24 of the server 20. At this time, the NAT conversion of the global address of "http://211.11.110.15/WAO2:9000" and the local address of "http://192.168.1.1/WAO2:9000" is carried out bidirectionally in the router 50.

Moreover, the case in which access is given to the server 20 from another client 10 that is not shown is the same. In other words, the same system ID, port number and IP address is used in access to be given from the first communication processing portion 11 to the access accepting portion 21. For example, the global address on the internet 30 is "http://211.11.110.15/WAO:9000" and the local address obtained by carrying out the NAT conversion over the global address on the internet 30 in the router 50 is "http://192.168.1.1/WAO:9000".

When the access accepting portion 21 accepts the access, the address generating portion 22 exchanges the system ID ("WAO") included in the local address used in the access into a further different system ID from that described above (for example, "WAO3"), thereby generating a new connection address of "http://192.168.1.1/WAO3:9000". The identification information notifying portion 23 uses the new connection address thus generated, thereby notifying another client 10 of the newly given system ID ("WAO3"). Moreover, the communication process generating portion 24 generates another communication process which is different from that described above.

After another client 10 is notified of the new system ID, a bidirectional communication is carried out by using a new connection address between the second communication processing portion 12 of the another client 10 and another communication process generated by the communication process generating portion 24 of the server 20. At this time, the NAT conversion of the global address of "http://211.11.110.15/WAO3:9000" and the local address of "http://192.168.1.1/WAO3:9000" is carried out bidirectionally in the router 50.

Figure 3:
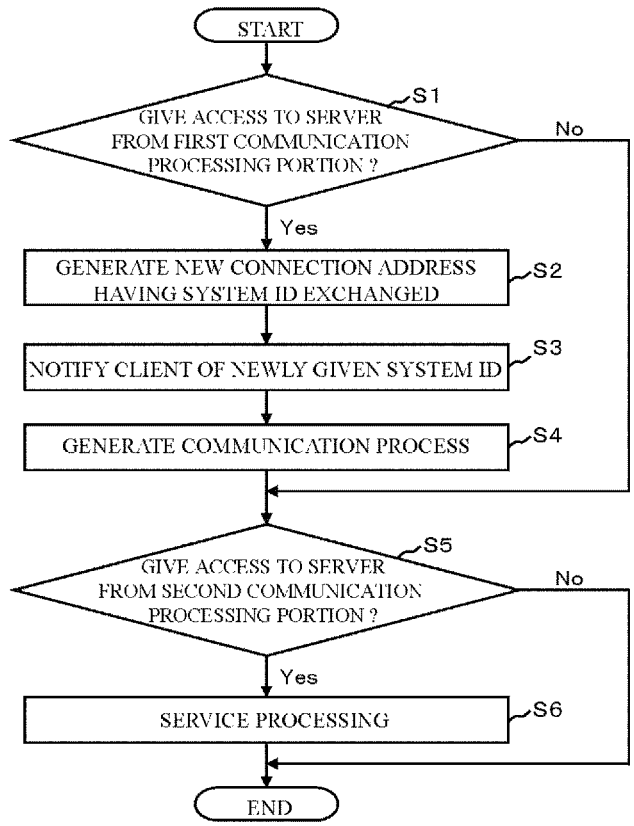
FIG. 3 is a flow chart showing an example of an operation of the server according to the present embodiment.
Figure 4:
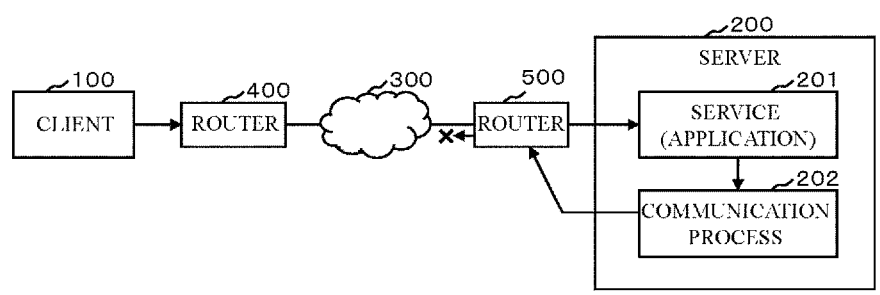
FIG. 4 is a block diagram showing an example of a structure of a conventional communication system.

FIG. 3 is a flowchart showing an example of an operation of the server 20 according to the present embodiment having the structure described above. A processing shown in the flowchart of FIG. 3 is always executed repetitively when a power supply of the server 20 is ON. In FIG. 3, the access accepting portion decides whether access is accepted from the first communication processing portion 11 of the client 10 or not (Step S1). If the access accepting portion 21 does not accept the access from the first communication processing portion 11, the processing proceeds to Step S5.

On the other hand, if the access accepting portion 21 accepts the access from the first communication processing portion 11, the address generating portion 22 exactly inherits an IP address and a port number which are included in a connection address used in the access, and at the same time, exchanges a fixed system ID given to the IP address into an optional system ID, thereby generating a new connection address (Step S2).

The identification information notifying portion 23 uses the new connection address generated by the address generating portion 22, thereby notifying the second communication processing portion 12 of the client 10 of the system ID given newly by the address generating portion 22 (Step S3). Moreover, the communication process generating portion generates a communication process for carrying out a subsequent communication with the client 10 (Step S4).

Then, the communication process generated by the communication process generating portion 24 decides whether access given from the second communication processing portion 12 of the client 10 is accepted or not (Step S5). If the communication process does not accept the access given from the second communication processing portion 12, the processing shown in FIG. 3 is ended. On the other hand, if the access given from the second communication processing portion 12 is accepted, the communication process returns, to the client 10, a service demanded by the client 10 (a result of a processing in application software) (Step S6).

Access may be given from the second communication processing portion 12 to the communication process immediately after data are transmitted from the communication process of the server 20 to the second communication processing portion 12 of the client 10. When the communication process receives the access and is thus brought into a standby state so that a processing of a service is completed by the application software, a result of the processing may be transmitted to the client 10. Thus, it is possible to transmit data to the client 10 in an active action started from the server 20.

As described above in detail, in the present embodiment, when access is given from the client 10 to the server 20 through the routers 40 and 50, an optional system ID is given to an IP address sent with a conversion from a global address to a local address through the router 50, thereby generating a new connection address in the server 20 and the client 10 is then notified of the system ID. Moreover, the server 20 generates a communication process for carrying out a communication with the client 10 and the communication process performs a subsequent communication with the client 10 based on the new connection address.

According to the present embodiment thus constituted, when access is given from the client 10 to the server 20, a communication process is generated to carry out a subsequent communication and a new connection address to be used in the communication process is set. At this time, the new connection address is set in such a configuration that an IP address used in the access from the client 10 to the server 20 is exactly inherited and an optional system ID is given.

For this reason, the IP address itself is not changed. Therefore, it is possible to use, without problems, the NAT function of the routers 40 and 50 which causes a global address and a local address to correspond to each other in a one-to-one relationship. Moreover, a new connection address is set in such a configuration that an optional system ID is given in place of a port number having a limitation of the number of availability. Consequently, it is also possible to increase the number of the clients 10 capable of carrying out NAT traversal and offering a service at the same time. In other words, communications from the clients 10 can be received with a single port number.

Furthermore, it is possible to apply a mechanism for the NAT traversal according to the present invention while using an HTTP protocol without requiring to utilize an exclusive protocol for the NAT traversal. By combining .NET Remoting with the HTTP, it is also possible to easily implement a data communication in a binary format.

Although the description has been given to the example in which the connection address constituted by adding the system ID and the port number to the IP address is used in the embodiment, the present invention is not restricted thereto. For example, it is also possible to use a connection address constituted by adding only the system ID to the IP address.

Although the description has been given to the example in which the system ID and the port number are also used in the connection address to be utilized when the first communication processing portion 11 gives access to the access accepting portion 21 in the embodiment, moreover, the present invention is not restricted thereto. For example, only the IP address may be employed without the use of the system ID and the port number for the connection address to be utilized when the first communication processing portion 11 gives access to the access accepting portion 21.

Although the description has been given to the example in which the peculiar system ID to the bidirectional communication system is used as the identification information to be applied to the IP address in the connection address to be utilized when the first communication processing portion 11 gives access to the access accepting portion 21 in the embodiment, furthermore, the present invention is not restricted thereto. In other words, it is also possible to use fixed identification information, that is, any information other than the system ID.

INDUSTRIAL APPLICABILITY

The present invention can be utilized in a bidirectional communication system of an SaaS type having a structure in which a client can be connected to a server through a router on internet and a service to meet a demand sent from the client is offered by application software on the server.

The invention claimed is:

1. A bidirectional communication system having a structure in which a client can be connected to a server inside of a router and the server offers a service to meet a demand sent from the client by application software, wherein:
   the router receives a first connection address, the first connection address including a combination of a global IP address, a fixed system identifier ("ID") and a fixed port number, to be used for accessing from the client to the server,
   the router generates a second connection address by converting the global IP address within the first connection address to a local IP address,
   the server inside of the router being programmed to:
      accept, via access acceptor software, an offer of a service through an access to be given from the client through the router to the server, by using the second connection address;
      first generate, via address generator software, a third connection address by exchanging the fixed system ID of the second connection address with a different system ID which is different from the fixed system ID while exactly inheriting the local IP address and the port number which are included in the second connection address;
      notify, via identification information notifier software, the client of the different system ID through the router by using the third connection address; and
      second generate, via communication process generator software, a communication process for carrying out a communication with the client based on the third connection address,
      wherein the local IP address and the port number of the second and third addresses are the same, and
   the client includes:
      a first communication processor for first accessing the server by using the first connection address; and
      a second communication processor for carrying out a communication with the communication process generated by the server, and using the third connection address which is different from the first connection address, thereby receiving an offer of the service as a response of an access to the communication process.

2. A server apparatus having such a structure as to be connectable to a client through a router and to offer a service to meet a demand sent from the client by application software, the server being programmed by software to perform acts comprising:
   accepting an offer of a service through an access to be given from the client by using an initial connection address including a combination of a local IP address a fixed system ID and a fixed port number;
   first generating a new connection address by exchanging the fixed system ID of the initial connection address with a different system ID which is different from the fixed system ID while exactly inheriting the local IP address and the port number which are included in the initial connection address;
   notifying the client of the different system ID through the router by using the new connection address; and
   second generating a communication process for carrying out a communication with the client based on the new connection address,
   wherein the communication process is constituted to communicate with the client by using the new connection address, thereby offering the service as a response of an access from the client;
   wherein the local IP address and the port number of the initial and new addresses are the same.

* * * * *